United States Patent Office 3,711,550
Patented Jan. 16, 1973

3,711,550
ISOMERIZATION OF 4,4'-METHYLENEDI (CYCLO-HEXYLAMINE) OVER MODERATED RUTHENIUM CATALYST
Loren D. Brake, Wilmington, Del., assignor to E. I. du Pont de Nemours and Company, Wilmington, Del.
No Drawing. Continuation-in-part of application Ser. No. 691,984, Dec. 20, 1967, which is a continuation-in-part of applications Ser. No. 516,107, Dec. 23, 1965, and Ser. No. 587,979, Oct. 20, 1966, all now abandoned. This application Feb. 16, 1970, Ser. No. 11,830
Int. Cl. C07c 87/32
U.S. Cl. 260—563 B  8 Claims

ABSTRACT OF THE DISCLOSURE

A mixture of the stereoisomers of 4,4'-methylene-di-(cyclohexylamine) not at equilibrium is converted to a mixture of stereoisomers approaching equilibrium ratio by heating the mixture of stereoisomers in the absence of added ammonia to a temperature of from 150° to 300° C. in the presence of hydrogen at a partial pressure of from 50 to 5500 pounds per square inch and at a total pressure of from 500 to 15,000 pounds per square inch in the presence of from 0.001 to 10 weight percent of a ruthenium catalyst, calculated as ruthenium metal and based on the starting weight of mixed isomers, the ruthenium being supported on an inert carrier and having been alkali moderated with from 0.1 to 15 weight percent of a basic alkali metal compound calculated as the alkali metal.

CROSS-REFERENCE TO RELATED APPLICATIONS

This application is a continuation-in-part of my copending application Ser. No. 691,984 now abandoned filed Dec. 20, 1967 which in turn was a continuation-in-part of my then copending application Ser. No. 587,979, filed Oct. 20, 1966, now abandoned, and my then copending application Ser. No. 516,107, filed Dec. 23, 1965, now abandoned.

BACKGROUND OF THE INVENTION

This invention relates to an improvement in the process for isomerizing 4,4'-methylenedi(cyclohexylamine) not at equilibrium to a mixture of stereoisomers approaching the equilibrium ratio under hydrogen pressure; the improvement comprising carrying out the isomerization reaction with a basic alkali moderated ruthenium catalyst in the absence of added ammonia.

The various methods known to the art for preparing 4,4'-methylenedi(cyclohexylamine), hereinafter referred to as PACM, produce a variety of mixtures of the cis,cis-, the cis,trans- and the trans,trans-stereoisomers.

It is disclosed in the art that a mixture of the stereoisomers of PACM no at equilibrium is converted to a mixture of stereoisomers approaching equilibrium ratio by heating the mixture of stereoisomers in the presence of added ammonia at a temperature of 180° C. to 250° C. in the presence of hydrogen at a partial pressure above about 500 pounds per square inch in the presence of a ruthenium catalyst. See Arthur U.S. Pat. No. 3,155,724.

The discovery that it is possible to take a single stereoisomer of the three stereoisomers of PACM, or a mixture of any two or all three of these stereoisomers, characterized in that such isomer or mixture of isomers is at a concentration other than the equilibrium concentration or equilibrium ratio of the isomer or isomers, and subjecting this to the conditions of the process of the Arthur patent whereby the stereoisomer or mixture of stereoisomers is adjusted in concentration or ratio closer to the equilibrium concentration or ratio, made it unnecessary to discard previously unwanted mixtures of the PACM stereoisomers.

I have now discovered that the use of a ruthenium catalyst supported on an inert carrier which has been alkali moderated with from 0.1 to 15 weight percent of a basic alkali metal compound, calculated as the alkali metal, in the absence of added ammonia, results in a surprising reduction in the by-product formation in the isomerization process for PACM.

It is important to emphasize that the use of an alkali moderated ruthenium catalyst in the process of this invention results in a surprising reduction in the undesirable by-products formed, most notably the formation of high molecular weight polyamines, as compared to the by-product formation which occurs with an unmoderated catalyst. The improvement is even more striking when the comparison is carried out in the absence of added ammonia.

It is also important to emphasize that the process of this invention does not require the addition of amonia to obtain high yields as required in the prior art. A process which does not require the addition of ammonia has obvious advantages, the foremost being that further processing can be carried out directly on the reactor effluent without a necessary intermediate step to remove the dissolved ammonia. The process of this invention has the advantage of not requiring ammonia injection and recovery facilities nor operations.

SUMMARY OF THE INVENTION

In summary, this invention is directed to an improvement in the process for isomerizing a mixture of the stereoisomers of PACM not at equilibrium ratio such that the isomer mixture is brought closer to the equilibrium ratio by subjecting the isomer mixture to hydrogen at a partial pressure of from 50 to 5500 pounds per square inch and a total pressure of 500 to 15,000 pounds per square inch at a temperature of from 150° to 300° C., the improvement comprising carrying out the process in the absence of added ammonia and in the presence of from 0.001 to 10 percent of ruthenium catalyst based on the weight of mixed isomers and calculated as metallic ruthenium, said catalyst being supported on an inert carrier and having been alkali moderated with from 0.1 to 15 weight percent of a basic alkali metal compound calculated as the alkali metal.

By this procedure a mixture of PACM stereoisomers rich in cis,cis-stereoisomer is brought to a ratio of stereoisomers approaching equilibrium as in a mixture of PACM stereoisomers rich in the cis,trans-stereoisomer or the trans,trans-stereoisomer or any single stereoisomer.

DESCRIPTION OF THE INVENTION

According to the broad concept of this invention, I have discovered that it is possible to take a single stereoisomer of the three stereoisomers of PACM, or a mixture of any two or all three of these stereoisomers, characterized in that such stereoisomer or mixture of stereoisomers is at a concentration other than the equilibrium concentration or equilibrium ratio of the stereoisomer or stereoisomers, and by subjecting this PACM to a temperature of from 150° C. to 300° C. in the absence of added ammonia, and in the presence of hydrogen and an alkali moderated ruthenium catalyst, the stereoisomer or mixture of stereoisomers is adjusted in concentration or ratio closer to the equilibrium concentration or ratio and, in a preferred embodiment, to a concentration or ratio approaching equilibrium.

It will be clearly understood that the starting materials in the process of this invention are hydrogenated saturated stereoisomers of 4,4'-methylenedi(cyclohexylamine).

It will also be understood that the expressions "equilibrium concentration" and "equilibrium ratio" are used in their conventional sense to mean the relative proportion of stereoisomeric PACM components in any given PACM product, wherein the stereoisomeric component or components are present in a state of greatest stereoisomer stability and lowest free energy. For the three stereoisomers of PACM, the equilibrium concentration, as well as can be determined analytically, exists in the proportions by weight of about 54.5% trans,trans-stereoisomer, about 38.5% cis,trans-stereoisomer and about 7% cis,cis-stereoisomer.

It will be understood also that this invention makes it possible to take a plain mixture of, say, 37% by weight of the trans,trans-stereoisomer, 55% by weight of the cis,trans-stereoisomer, and 8% by weight of the cis,cis-stereoisomer of PACM and convert this mixture readily to, say, a mixture of 53% trans,trans-stereoisomer, 40% cis,trans-stereoisomer, and 7% cis,cis-stereoisomer. In the other direction from the equilibrium concentration, it is equally simple according to the present invention to take a stereoisomeric mixture containing, say, about 70% by weight of the trans,trans-stereoisomer of PACM, about 25% of the cis,trans-stereoisomer of PACM, and the remaining 5% of the cis,cis-stereoisomer, and convert this mixture according to the process of the present invention to a mixture containing these three stereoisomers, respectively, in the proportions of approximately 54:40:6.

According to this invention, the starting stereoisomer material or mixture of stereoisomers of PACM not at equilibrium concentration is subjected to hydrogenation conditions using hydrogen at elevated temperatures and pressure, in the presence of an alkali moderated ruthenium catalyst.

It is important to emphasize that the starting PACM is fully saturated, i.e. fully hydrogenated, and therefore the process of the invention is not merely a simple hydrogenation reaction. For some reason not fully understood, the particular combination of hydrogenating conditions using hydrogen at an elevated temperature and in the critical presence of an alkali moderated ruthenium catalyst causes a shift of stereoisomer ratio towards the equilibrium concentration.

The process is carried out for a time sufficient to reach a desired stereoisomeric ratio or content. Most frequently, it will be desired to attain the equilibrium concentration and this can readily be reached in less than one hour, and ordinarily in less than 30 minutes. Once a desired stereoisomeric ratio or content is achieved, additional holdup or exposure under the isomerization conditions of this invention serve no particular purpose.

The starting PACM stereoisomer or mixture of stereoisomers can be obtained in any suitable way. For example, the methods of Whitman U.S. Pat. No. 2,606,924 produce a normally liquid mixture of stereoisomeric PACM high in cis,trans-stereoisomer content that can readily be converted by the present invention to a mixture approaching or at the equilibrium concentration.

The starting PACM can also have present up to about 20% or more of 2,4'-methylenedi(cyclohexylamine), also known as 2,4'-PACM.

The alkali moderated ruthenium catalyst will be used according to the present invention in an amount of at least 0.001 weight percent and less than about 10%, based on the starting PACM and calculated as metallic ruthenium, and preferably in amounts of from 0.01 to 1% on the same basis.

The ruthenium catalysts suitable for use in the processes of this invention are those which have been moderated with an alkali metal compound in a manner such as will be described hereinafter.

The ruthenium is extended on an inert carrier such as alumina, barium sulfate, kieselguhr or carbon. Such extended catalysts can be prepared, for example, by slurrying the support in an aqueous ruthenium chloride solution, precipitating the ruthenium values with ammonium bicarbonate, digesting at 60–90° C., filtering, washing, drying, and activating by means well known in the art. Other means for preparing the extended catalysts will be obvious to those skilled in the art. Suitable inert carriers are described in chapter 7 of Catalysis by S. Berkman, J. C. Morrell, and G. Egloff, Reinhold Publishing Corp., N.Y. (1940), or chapter 6 of Catalysis Vol. 1 by P. H. Emmett, Reinhold Publishing Corp., N.Y. (1940).

Alkali moderation of the ruthenium catalysts consists of associating a basic alkali metal compound with the catalyst. Preferred basic alkali metal compounds are lithium, cesium, rubidium, sodium and potassium hydroxide, carbonates, bicarbonates, methoxides, ethoxides, propoxides, tert-butoxide and other alkoxides, and sodamide. Alkali moderation can be accomplished by depositing a ruthenium compound on a support from an aqueous solution of sodium or potassium bicarbonate as disclosed in my British Pat. No. 1,176,336 or by treating a supported ruthenium catalyst prior to reduction such as with dilute sodium or potassium hydroxide also disclosed in British Pat. No. 1,176,336, or by treating a supported ruthenium catalyst after reduction such as in situ treatment of the catalyst with sodium, potassium, or lithium methoxide during a hydrogenation reaction also disclosed in British Pat. No. 1,176,336.

Extent of alkali moderation can be determined by analysis of the treated catalyst for alkali metal content using conventional analytical means such as atomic absorption spectrophotometry. Thus, for example, if a catalyst analyzes 5 weight percent sodium, it is considered to be alkali moderated to the extent of 5%. The extent of alkali moderation can range from 0.1% up to 15%, depending to some degree on the support. An alumina support, for example, will associate to a greater degree with a basic alkali metal compound than will be a barium sulfate support. It is preferred that the extent of alkali moderation lie in the range of .5% to 10%.

It is not essential that this process be carried out in the presence of a solvent for the PACM. However, a solvent can be employed if desired. The solvents which can be used according to this invention are generally inert liquid organic solvents, i.e. those which are not subject to hydrogenation under the conditions of this process. Representative of the suitable solvents are saturated aliphatic and alicyclic hydrocarbons such as n-hexane and cyclohexane; saturated alcohols such as methyl alcohol, ethyl alcohol, isopropyl alcohol and n-butanol; and, preferably, the aliphatic and alicyclic hydrocarbon ethers, such as n-propyl ether, n-butyl ether, ethyl ether, isopropyl ether, isobutyl ether, the amyl ethers, tetrahydrofuran, dioxolene, dioxane, dicyclohexyl ether, and others.

The process of this invention is carried out at elevated temperatures and pressures. Temperatures on the order of 150° C. to 300° C., and preferably about 200° to 245° C., should be used.

The process is run at hydrogen partial pressures above about 50 pounds per square inch and preferably from about 500 to 5500 pounds per square inch. Higher hydrogen partial pressures can, of course, be used but little practical advantage is obtained. Similarly lower hydrogen partial pressures can be used, pressures as low as 1 p.s.i. still permitting smooth operation. However, yields generally are somewhat poorer at these low hydrogen pressures so that they are ordinarily avoided. Ordinarily, total pressures during isomerization range from about 500 pounds per square inch up to about 15,000 pounds per square inch, these being practical limits for reasons of cost of operation and equipment.

It will be understood by those skilled in the art that this process can be carried out in a batch operation, or in a continuous or semi-continuous operation.

It will also be understood that in a continuous process utilizing thorough back-mixing the quantities of catalyst used will still be within the range set out above, but the quantities will be calculated on the basis of total reactor content rather than on the basis of initial charge.

It will also be readily appreciated that the process for the hydrogenation of para,para'-methylenedianiline to PACM, wherein such hydrogenation is effected at elevated temperature and pressure and using an alkali moderated ruthenium catalyst, encompasses recycle of part or all of the PACM back into the reaction zone where it is subjected to the critical conditions of the process of the present invention. Such a recycle operation in PACM manufacture thus permits the preparation of a PACM product at or very close to the equilibrium concentration. The process can also be followed by crystallization to produce a material high in the trans,trans-stereoisomer. The mother liquor remaining after removal of crystals which is rich in cis,trans-stereoisomer and not useful for the identical purpose as the PACM at equilibrium concentration or at higher than equilibrium trans,trans-stereoisomer concentrations, is readily recycled back into the main reaction where it is subjected to the conditions of the present invention and quickly converted to the desired concentration. The reverse is also possible: that is, to retain the liquid or high cis,trans-stereoisomer mixture and recycle the high trans,trans-stereoisomer fraction for isomerization back to equilibrium concentration. Over-all, this achieves a remarkably high yield of the desired product with production of little or no unwanted by-product.

In a recycle operation the amount of material being recycled will of course depend on the amount of undesired stereoisomers present as co-products. It will be understood that there will ordinarily be a larger amount of recycle in those operations where the PACM originally produced is further away from the equilibrium concentration of the mixture of stereoisomers or where the desired stereoisomer content to be obtained by a subsequent separation process is further from the equilibrium.

The usefulness of equilibrium concentration mixtures of stereoisomeric PACM is well known. Reaction of such PACM with sebacic acid forms polyamides of high melting point.

This invention will be better understood by reference to the following illustrative examples wherein parts and percentages are by weight unless otherwise specified.

EXAMPLE 1

At a temperature of 225° C. and a total pressure of 4200 pounds per square inch gage, 2000 parts of 4,4'-methylenedi(cyclohexylamine) containing about 11% cis,cis-, 58% cis,trans- and 31% trans,trans-stereoisomers is subjected to an atmosphere of hydrogen in the presence of 60 parts of a catalyst comprising about 5% ruthenium on a finely divided alumina and 12 parts sodium methoxide for 54 minutes. The resulting mixture is freed of catalyst by filtration. Final distillation under vacuum gives the fully saturated mixture of stereoisomers of 4,4'-methylenedi(cyclohexylamine) and shows less than 0.4% of by-product formation based on the saturated starting compound. The resulting product stereoisomer content is 8.7% cis,cis-, 39.6% cis,trans- and 51.7% trans,trans-stereoisomers.

EXAMPLE 2

At a temperature of 200° C. and a total pressure of 4250 pounds per square inch gage, 2000 parts of 4,4'-methylenedi(cyclohexylamine) containing about 13% cis,cis-, 60% cis,trans- and 27% trans,trans-stereoisomers is subjected to an atmosphere of hydrogen in the presence of 50 parts of a catalyst comprising about 5% ruthenium on a finely divided kieselguhr and 10 parts of sodium propoxide for 45 minutes. The resulting mixture is freed of catalyst by filtration. Final distillation under vacuum gives an insignificant amount of by-product impurities and 4,4'-methylenedi(cyclohexylamine) the stereoisomer content of which is 10.8% cis,cis-, 41.7% cis,trans- and 47.5% trans,trans-stereoisomers.

EXAMPLE 3

At a temperature of 225° C. and a hydrogen pressure of 500 pounds per square inch gage, 2000 parts of 4,4'-methylenedi(cyclohexylamine) containing about 12% cis,cis-, 57% cis,trans- and 31% trans,trans-stereoisomers is subjected to an atmosphere of hydrogen in the presence of 60 parts of a catalyst comprising about 5% ruthenium on a finely divided barium sulfate and 12 parts sodium methoxide for 20 minutes. The resulting mixture is freed of catalyst by filtration. Final distillation under vacuum gives a very small amount of by-product impurities and 4,4'-methylenedi(cyclohexylamine) with a stereoisomer content of 11.5% cis,cis-, 43.5% cis,trans- and 45% trans,trans-stereoisomers.

EXAMPLE 4

At a temperature of 245° C. and a hydrogen pressure of 5000 pounds per square inch gage, 50 parts of dioxane, and 100 parts of 4,4'-methylenedi(cyclohexylamine) containing about 13% cis,cis-, 58% cis,trans- and 30% trans,trans-stereoisomers is subjected to an atmosphere of hydrogen in the presence of 10 parts of a catalyst comprising about 5% ruthenium on a finely divided alumina and 1 part of potassium metholate for 60 minutes. The resulting mixture is freed of catalyst by filtration and distilled to strip off solvent. Final distillation under vacuum gives a mixture of stereoisomers of 4,4'-methylenedi(cyclohexylamine) and a small amount of by-product impurities. The resulting product stereoisomer content is 8.6% cis,cis-, 37.4% cis,trans- and 54% trans,trans-stereoisomers.

EXAMPLE 5

Substitution of isopropyl ether for dioxane in Example 4 produces results similar to those of Example 4.

EXAMPLE 6

At a temperature of 280° C. and a total pressure of 8000 pounds per square inch gage, 50 parts of dioxane, and 100 parts of 4,4'-methylenedi(cyclohexylamine) containing about 13% cis,cis-, 58% cis,trans- and 30% trans,trans-stereoisomers is subjected to an atmosphere of hydrogen in the presence of 10 parts of a catalyst comprising about 5% ruthenium on a finely divided alumina and 0.8 part of 50% aqueous potassium hydroxide for 45 minutes. The resulting mixture is freed of catalyst by filtration and distilled to strip off solvent. Final distillation under vacuum gives 4,4'-methylenedi(cyclohexylamine) and a small amount of by-product impurities. The stereoisomer content is 8.9% cis,cis-, 38.6% cis,trans-, and 52.5% trans,trans-stereoisomers.

Substitution in the above procedure, of 50% aqueous sodium hydroxide for the 50% aqueous potassium hydroxide, gives results similar to those obtained.

EXAMPLE 7

In a steel autoclave fitted with a stirring apparatus and a product draw off system for retaining the catalyst in the reactor, there is placed 2000 parts of 4,4'-methylenedi-(cyclohexylamine), 60 parts of a finely divided 5% ruthenium on an alumina support and 12 parts of sodium methoxide. The material is heated to 275° C. with stirring and hydrogen is added to maintain a pressure of 290 atmospheres. Additional 4,4' - methylenedi(cyclohexylamine) containing about 13% cis,cis-, 62% cis,trans- and 25% trans,trans-stereoisomers is fed to the autoclave at such a rate as to maintain a 17 minute resident time while product is drawn off to maintain a fixed reactor volume. Final distillation of the product under vacuum gives the fully saturated mixture of stereoisomers of 4,4'-methylenedi-(cyclohexylamine) and by-product impurities in an amount of less than 0.4%. The product stereoisomer content is 11.9% cis,cis-, 43.1% cis,trans-, and 45% trans,trans-stereoisomers.

EXAMPLE 8

In a steel autoclave fitted with a stirring apparatus and a product draw off system retaining the catalyst in the reactor, there is placed 2000 parts of 4,4'-methylenedi-(cyclohexylamine), 100 parts of a finely divided 5% ruthenium on an alumina support and 20 parts of sodium methoxide. The material is heated to 225° C. with stirring and hydrogen is added to maintain a pressure of 290 atmospheres. Additional 4,4'-methylenedi(cyclohexylamine) containing about 15% cis,cis-, 65% cis,trans- and 20% trans,trans-stereoisomers is fed to the autoclave at such a rate as to maintain a 45 minute resident time while product is drawn off to maintain a fixed reactor volume. Final distillation of the product under vacuum gives the fully saturated mixture of stereoisomers of 4,4'-methylenedi-(cyclohexylamine) and by-product impurities in an amount of less than 0.9%. The product stereoisomer content is 10.3% cis,cis-, 40.4% cis,trans- and 49.3% trans,trans-stereoisomers.

EXAMPLE 9

In a steel autoclave fitted with stirring apparatus and a product draw off system retaining the catalyst in the reactor, there is placed 2000 parts of 4,4'-methylenedi(cyclohexylamine), 60 parts of a finely divided 5% ruthenium on an alumina support and 12 parts of sodium methoxide. The material is heated to 225° C. with stirring and hydrogen added to maintain a pressure of 290 atmospheres. Additional 4,4'-methylenedi(cyclohexylamine) containing about 13% cis,cis-, 57% cis,trans- and 30% trans,trans-stereoisomers is fed to the autoclave at such a rate as to maintain a 31 minute resident time while product is drawn off to maintain a fixed reactor volume. Final distillation of the product under vacuum gives the fully saturated mixture of stereoisomers of 4,4' - methylenedi(cyclohexylamine) and by-product impurities in an amount of less than 0.9%. The product stereoisomer content is 10.1% cis,cis-, 40.7% cis,trans- and 49.2% trans,trans-stereoisomers.

EXAMPLE 10

In a steel autoclave fitted with a stirring apparatus and a product draw off system retaining the catalyst in the reactor, there is placed 2000 parts of 4,4'-methylenedi(cyclohexylamine) and 59 parts ruthenium on alumina catalyst recovered from Example 9. The material is heated to 225° C. with stirring and hydrogen is added to maintain a pressure of 290 atmospheres. Additional 4,4'-methylenedi(cyclohexylamine) containing about 13% cis,cis-, 57% cis,trans-, and 30% trans,trans-stereoisomers is fed to the autoclave at such a rate as to maintain a 31 minute resident time while product is drawn off to maintain a fixed reactor volume. Final distillation of the product under vacuum gives the fully saturated mixture of stereoisomers of 4,4'-methylenedi(cyclohexylamine) and by-product impurities in an amount of less than 1.2%. The product stereoisomer content is 10% cis,cis-, 41.2% cis,trans-, and 48.8% trans,trans-stereoisomers.

EXAMPLE 11

In a steel autoclave fitted with a stirring apparatus and a product draw off system retaining the catalyst in the reactor, there is placed 2000 parts of 4,4'-methylenedi-(cyclohexylamine) and 57.5 parts ruthenium on alumina catalyst recovered from Example 10. The material is heated to 225° C. with stirring and hydrogen added to maintain a pressure of 290 atmospheres. Additional 4,4'-methylenedi(cyclohexylamine) containing about 13% cis,cis-, 57% cis,trans-, and 30% trans,trans-stereoisomers is fed to the autoclave at such a rate as to maintain a 31 minute resident time while product is drawn off to maintain a fixed reactor volume. Final distillation of the product under vacuum gives the fully saturated mixture of stereoisomers of 4,4'-methylenedi(cyclohexylamine) and by-product impurities in an amount of less than 1.0%. The product stereoisomer content is 8.8% cis,cis-, 41.1% cis,trans-, and 50.1% trans,trans-stereoisomers.

EXAMPLE 12

In a steel autoclave fitted with stirring apparatus and a product draw off system retaining the catalyst in the reactor, there is placed 2000 parts of 4,4'-methylenedi(cyclohexylamine), 100 parts of a finely divided 5% ruthenium on a kieselguhr support and 20 parts of sodium methoxide. The material is heated to 225° C. with stirring and hydrogen is added to maintain a pressure of 290 atmospheres. Additional 4,4'-methylenedi(cyclohexylamine) containing about 1% cis,cis-, 10% cis,trans-, and 89% trans,trans-stereoisomers is fed to the autoclave at such a rate as to maintain a 180 minute resident time while the product is drawn off to maintain a fixed reactor volume. Distillation of the product under vacuum gives the fully saturated mixture of stereoisomers of 4,4'-methylenedi(cyclohexylamine) and a small amount of by-product impurities. The product stereoisomers content is 7.8% cis,cis-, 39% cis,trans-, and 53.2% trans,trans-stereoisomers.

EXAMPLE 13

In a steel autoclave fitted with a stirring apparatus and a product draw off system retaining the catalyst in the reactor, there is placed 2000 parts of 4,4'-methylenedi(cyclohexylamine), 60 parts of a finely divided 5% ruthenium on an alumina support and 8 parts of sodium methoxide. The material is heated to 225° C. with stirring and hydrogen is added to maintain a pressure of 290 atmospheres. A mixture of 65% para,para'-methylenedianiline and 35% of 4,4'-methylenedi(cyclohexylamine) containing about 11% cis,cis-, 58% cis,trans-, and 31% trans,trans-stereoisomers is fed to the autoclave at such a rate as to maintain a 55 minute resident time while product is drawn off to maintain a fixed reactor volume. The product is distilled under vacuum to give the fully saturated mixture of stereoisomers of 4,4'-methylenedi(cyclohexylamine) and by-product impurities in an amount less than 1.1% based on MDA and PACM charged. The product stereoisomer content is 9% cis,cis-, 42.8% cis,trans- and 47.2% trans,trans-stereoisomers.

EXAMPLE 14

A solution is prepared consisting of 5.6 parts ruthenium chloride, 6.7 parts 37% hydrochloric acid, and 67.7 parts of water. This solution is warmed to 65° C., whereupon addition of a solution of 20 parts sodium bicarbonate in 190 parts of water is begun. When ⅓ of the latter solution is added, the support material is dumped into the stirring solution. The support consists of an intimate physical mixture of 50 parts eta alumina and 0.75 parts sodium methoxide. The remaining sodium bicarbonate solution is added at such a rate that approximately 4 minutes is required. The resulting slurry is then digested for one hour at 65–70° C., filtered, then washed with 1200 parts of sodium bicarbonate solution in water. The product is given an additional wash with 800 parts of a 5% sodium hydroxide solution in water, then sucked dry. The air-dried cake is further dried at 150° C. then activated prior to use at 170–200° C. in a stream consisting of 95% nitrogen, 5% hydrogen.

By assay, the above catalyst contains 1.6% sodium by weight. Ten parts of the above prepared catalyst is mixed with 100 parts of 4,4'-methylenedi(cyclohexylamine) containing about 11% cis,cis-, 58% cis,trans-, and 31% trans,trans-stereoisomers and 50 parts of dioxane and the resulting mixture is subjected to an atmosphere of hydrogen at 225° C. and a total pressure of 5000 p.s.i.g. for 30 minutes. Workup of the product as described above gives the fully saturated mixture of stereoisomers of 4,4'-methylenedi(cyclohexylamine) and a small amount of by-product impurities. The product contains 49.9% of the trans,trans-stereoisomer. The catalyst is recovered, washed with dioxane to remove organics and analyzes 1.3% by weight sodium.

EXAMPLE 15

At a temperature of 225° C. and a total pressure of 4200 pounds per square inch gage, 2000 parts of 4,4'-methylenedi(cyclohexylamine) containing about 11% cis,cis-, 58% cis,trans- and 31% trans,trans-stereoisomers, is subjected to an atmosphere of hydrogen in the presence of 60 parts of a catalyst comprising 5% ruthenium on carbon and 10 parts of sodium methoxide for 60 minutes. The resulting mixture is freed of catalyst by filtration. The product contains little by-product impurities and has a stereoisomer content of 9.0% cis,cis-, 41.1% cis,trans- and 49.9% trans,trans-stereoisomers.

EXAMPLE 16

At a temperature of 225° C. and a total pressure of 4200 pounds per square inch gage, 2000 parts of 4,4'-methylenedi(cyclohexylamine) containing about 11% cis,cis-, 58% cis,trans- and 31% trans,trans-stereoisomers, is subjected to an atmosphere of hydrogen in the presence of 60 parts of a catalyst comprising 5% ruthenium on finely divided alumina, and 20 parts of a 50% aqueous slurry of rubidium hydroxide for 60 minutes. The resulting mixture is freed of catalyst by filtration. Distillation under vacuum gives the fully saturated mixture of stereoisomers which contains less than 0.4% of by-product impurities based on starting saturated compound. The product has a stereoisomer content of 11.5% cis,cis-, 43.5% cis,trans- 45.0% trans,trans-stereoisomers.

EXAMPLE 17

At a temperature of 225° C. and a total pressure of 4200 pounds per square inch gage, 2000 parts of 4,4'-methylenedi(cyclohexylamine) containing about 11% cis,cis-, 58% cis,trans- and 31% trans,trans-stereoisomers, is subjected to an atmosphere of hydrogen in the presence of 60 parts of a catalyst comprising 5% ruthenium on finely divided alumina, and 20 parts of a 50% aqueous slurry of cesium hydroxide for 60 minutes. The resulting mixture is freed of catalyst by filtration. Distillation under vacuum gives the fully saturated mixture of stereoisomers which contain less than 0.4% by-product impurities based on starting saturated compound. The product has a stereoisomer content of 10.0% cis,cis-, 41.2% cis,trans- and 48.8% trans,trans-stereoisomers.

EXAMPLE 18

At a temperature of 225° C. and a total pressure of 50 pounds per square inch gage, 2000 parts of 4,4'-methylene-di(cyclohexylamine) containing about 11% cis,cis-, 58% cis, trans- and 31% trans,trans-stereoisomers, is subjected to an atmosphere of hydrogen in the presence of 60 parts of a catalyst comprising 5% ruthenium on finely divided alumina, and 10 parts of sodium methoxide. The resulting mixture is freed of catalyst by filtration. The product contains little by-product impurities and has a stereoisomer content of 6.1% cis,cis-, 43.1% cis,trans- and 50.8% trans,trans-stereoisomers.

The invention claimed is:

1. A process for altering the ratio of a mixture of stereoisomers of 4,4'-methylenedi(cyclohexylamine), said mixture not being at the equilibrium concentration of stereoisomeric 4,4' - methylendi(cyclohexylamine), and bringing said mixture closer to the equilibrium concentration, said process comprising subjecting to a temperature of from 150 to 300° C. and a total pressure of 500 to 15,000 lbs. per square inch gauge a reaction mixture consisting essentially of the following components:
  (a) the mixture of stereoisomers of 4,4'-methylenedi-(cyclohexylamine) not at equilibrium,
  (b) gaseous hydrogen at a hydrogen partial pressure of from 50 to 5,500 lbs. per square inch gauge, and
  (c) 0.001 to 10% of a ruthenium catalyst calculated as ruthenium and based on the weight of the starting 4,4'-methylenedi(cylclohexylamine), said ruthenium catalyst being supported on a carrier selected from among alumina, barium sulfate, kieselguhr, and carbon; the supported catalyst being moderated with from 0.1 to 15% by weight of a basic alkali metal compound calculated as the alkali metal.

2. The process as set forth in claim 1 wherein said process is carried out in a liquid inert organic solvent.

3. The process of claim 1 wherein the ruthenium is supported on alumina.

4. The process of claim 1 wherein the catalyst is moderated with an alkali metal compound selected from the group consisting of the hydroxides, carbonates, bicarbonates and alkoxides of sodium, lithium, cesium, rubidium and potassium and sodamide.

5. The process of claim 4 wherein the catalyst is supported on alumina.

6. The process of claim 1 in which the hydrogen partial pressure is between 500 and 5500 pounds per square inch, the temperature is between 200 and 245° C., and the catalyst is moderated with from 0.5 to 10% by weight of sodium.

7. The process of claim 6 wherein said process is carried out in a liquid inert organic solvent.

8. The process of claim 6 wherein the catalyst is supported on alumina and is present in amounts of from 0.01 to 1% calculated as ruthenium and based on the weight of 4,4'-methylenedi(cyclohexylamine).

References Cited

UNITED STATES PATENTS

| | | | |
|---|---|---|---|
| 2,606,925 | 8/1952 | Whitman | 260—563 D |
| 3,155,724 | 11/1964 | Arthur | 260—563 B |
| 3,177,258 | 4/1965 | Rylander et al. | 260—563 D X |

LEWIS GOTTS, Primary Examiner

D. R. PHILLIPS, Assistant Examiner

U.S. CL. XR

252—447, 466, 474; 260—563 D